2,738,359

Patented Mar. 13, 1956

2,738,359

METHOD OF SEPARATING CHLOROSILANES

James F. Hyde, Midland, Mich., assignor to Dow Corning Corporation, Midland, Mich., a corporation of Michigan No Drawing. Application February 23, 1955,
Serial No. 490,140

4 Claims. (Cl. 260—448.2)

This invention relates to a chemical method of separating silicon tetrachloride and monoorganotrichlorosilanes from dichloro and monochlorosilanes.

One of the problems which has long beset the organosilicon industry has been the separation of silicon tetrachloride and especially of monoorganotrichlorosilanes from dichlorosilanes. This problem has its origin in the fact that the introduction of methyl groups into trichlorosilanes increases the boiling point only slightly over the original trichlorosilane. For example, methyltrichlorosilane boils at 66.4° C. while dimethyldichlorosilane boils at 70.3° C., monophenyltrichlorosilane boils at 201° C. while phenylmethyldichlorosilane boils at 205° C., and monovinyltrichlorosilane boils at 90.5° C. as compared with 92° C. for vinylmethyldichlorosilane. The fact that these boiling points are in close proximity makes it impossible in commercial operations to completely separate the chlorosilanes by distillation. The only practical method now present is to hydrolyze the crude mixture of diorganodichloro and monoorganotrichlorosilanes and then to heat the resulting siloxane in the presence of an alkali metal hydroxide which causes the diorganosiloxane to separate in the form of cyclic materials. However, this method leaves much to be desired when dealing with high boiling materials such as phenylmethylsiloxanes or with comparatively unstable materials such as vinylsiloxanes. Consequently, a chemical method of separation of the chlorosilanes which can be carried out at room temperature or under mild conditions is highly desirable.

It is the object of this invention to provide a method for separating chlorosilanes. Another object is to provide a method for separating chlorosilanes which is commercially feasible. Other objects and advantages will be apparent from the following description.

In accordance with this invention a mixture of chlorosilanes having the formula $R_nSiCl_{4-n}$ and $R_aSiCl_{4-a}$ in which R is a monovalent hydrocarbon radical having less than 7 carbon atoms or a halogenated monovalent hydrocarbon radical, $n$ has a value from 0 to 1 inclusive and $a$ has a value from 2 to 3 inclusive, is separated by contacting said mixture with formamide or dimethylformamide in amount at least equivalent to the total silicon tetrachloride and monoorganosilane in the mixture and thereafter separating the diorgano and triorganosilanes from the mixture.

This invention is based on the discovery that $SiCl_4$ and $RSiCl_3$ compounds will form crystalline nonvolatile complexes when contacted with the defined amides while $R_2SiCl_2$ and $R_3SiCl$ compounds do not. These complexes vary in composition from 2 to 4 molecules of amide to 1 molecule of chlorosilane and may be represented by the generic formula $R_nSiCl_{4-n} \cdot XHCONR'_2$ where X has a value from 2 to 4 inclusive, R' is methyl or hydrogen and R and $n$ are as above defined.

When dimethylformamide or formamide are brought into contact with the above-defined monoorganochlorosilanes or with silicon tetrachloride they react spontaneously to form complexes which are generally crystalline materials that are insoluble in diorgano and triorganochlorosilanes. The reaction with the monoorganochlorosilanes and the silicon tetrachloride is essentially quantitative and consequently it is possible to remove all of these ingredients from a chlorosilane mixture. In carrying out the process of this invention it is only necessary to mix the formamides with the chlorosilanes. Any monoorganochlorosilane and silicon tetrachloride in the mixture will then precipitate and can be removed by filtration or decantation. Alternatively, the resulting material may be distilled and the diorgano and/or triorganochlorosilanes are collected as the distillate while the monoorganochlorosilane and silicon tetrachloride will remain as distillation residue in the form of the aforesaid complexes.

Whereas any monoorganochlorosilane will form a complex with a wide variety of amides, many of these complexes are appreciably soluble in the diorgano and triorganochlorosilanes. Furthermore, the complexes of the higher organochlorosilanes are not sufficiently thermally stable to allow the diorganodichlorosilane to be distilled away from the complex without appreciable dissociation. Consequently, those organochlorosilanes wherein the organic groups have more than 6 carbon atoms cannot be satisfactorily separated by the method of this invention.

Chlorosilane mixtures which are operative in the process of this invention are mixtures of chlorosilanes in which the R groups are alkyl radicals such as methyl, ethyl, propyl and butyl; alkenyl radicals such as vinyl, allyl and hexenyl and phenyl radicals and halogenated hydrocarbon radicals such as tetrafluoroethyl, chlorophenyl, tetrafluorocyclobutyl and trifluorochlorocyclobutyl.

In carrying out the process of this invention the amides may be added to the chlorosilanes and the mixture allowed to stand until the complex has precipitated. Alternatively, the process may be carried out continuously by passing a mixture of the chlorosilanes through a column which contains the amides absorbed on a carrier such as charcoal, asbestos and the like or by continuously extracting the monoorganochlorosilane and/or $SiCl_4$ from the mixture by liquid interchange.

The amount of amides employed in the method of this invention should be at least equivalent to the amount of monoorganochlorosilane and/or silicon tetrachloride in the mixture. It has been found in general that the complexes formed contain from 2 to 4 molecules of amide per molecule of silane. For best results, therefore, at least 2 mols of amide should be added for every mol of monoorganochlorosilane and/or silicon tetrachloride in the mixture.

The purified chlorosilanes are useful in the preparation of high polymeric disiloxanes which are employed in silicone rubbers.

The following examples are illustrative only and should not be construed as limiting the invention which is properly delineated in the appended claims.

Example 1

To a mixture of 100 parts by weight of dimethyldichlorosilane and 10 parts by weight of methyltrichlorosilane, 40 g. of formamide were added with shaking. The mixture formed two layers, the top layer being the chlorosilanes. After standing for a while, this top layer was decanted. It was then distilled and there was obtained pure dimethyldichlorosilane. This was proven by the fact that the distillate was hydrolyzed and polymerized with an alkaline catalyst at 75° C. The material polymerized to a high polymer with no sign of gellation indicating complete removal of the monomethyltrichlorosilane. The bottom layer contained a crystalline material of the formula $MeSiCl_3 \cdot 4HCONH_2$.

Example 2

40 g. of dimethylformamide was added to a mixture of 100 parts by weight dimethyldichlorosilane and 10 parts by weight silicon tetrachloride. A white solid complex separated. The mixture was then distilled whereupon pure dimethyldichlorosilane was obtained together with a solid complex which formed the distillation residue. This complex had the formula $SiCl_4 \cdot 3HCONMe_2$.

Example 3

Equivalent results were obtained when a mixture of 50 parts by weight of trimethylchlorosilane and 5 parts by weight silicon tetrachloride were separated in accordance with the method of Example 2.

Example 4

The sample of methylvinyldichlorosilane which contained about 3% by weight vinyltrichlorosilane was mixed with dimethylformamide in amount of 15 mols of dimethylformamide per mol of vinyltrichlorosilane in the mixture. The mixture was allowed to stand for 22 hours and the solid complex $ViSiCl_3 \cdot 3HCONMe_2$ was removed by filtration. The filtrate was substantially pure vinylmethyldichlorosilane.

Example 5

To a mixture of 18.2 parts by weight of phenylmethyldichlorosilane and 1.1 parts by weight of phenyltrichlorosilane was added .45 part by weight of formamide. The mixture was allowed to stand at room temperature for 48 hours whereupon the solid complex $PhSiCl_3 \cdot 3HCONH_2$ precipitated and was removed by filtration. The filtrate was substantially pure phenylmethyldichlorosilane.

Example 6

Separation of the chlorosilanes is obtained when a mixture of 10 parts by weight chlorotrifluorocyclobutylmethyldichlorosilane and 1 part by weight of chlorotrifluorocyclobutyltrichlorosilane is treated with 4 parts by weight of dimethylformamide in accordance with the procedure of Example 5. The complex formed would have the formula

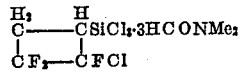

That which is claimed is:

1. A method of separating chlorosilanes of the formula $R_nSiCl_{4-n}$ from chlorosilanes of the formula $R_aSiCl_{4-a}$ in which $n$ has a value from 0 to 1 inclusive, $a$ has a value from 2 to 3 inclusive and R is selected from the group consisting of monovalent hydrocarbon radicals of less than 7 carbon atoms and halogenated monovalent hydrocarbon radicals of less than 7 carbon atoms which comprises contacting a mixture of said silanes with an amide of the group consisting of formamide and dimethylformamide in amount such that there is at least 2 mols of amide per mol of total silicon tetrachloride and monoorganotrichlorosilane in the mixture whereby a complex of the amide and any silicon tetrachloride and any monoorganotrichlorosilane is formed and thereafter separating said complex from the chlorosilane mixture.

2. A method of separating monomethyltrichlorosilane from dimethyldichlorosilane which comprises contacting a mixture of said silanes with an amide of the group consisting of dimethylformamide and formamide in amount such that there is at least 2 moles of amide per mol of monomethyltrichlorosilane and thereafter separating the complex of the amide and monomethyltrichlorosilane from the dimethyldichlorosilane.

3. A method of separating monophenyltrichlorosilane from phenylmethyldichlorosilane which comprises contacting a mixture of said silanes with an amide of the group consisting of dimethylformamide and formamide in amount such that there is at least 2 mols of amide per mol of phenyltrichlorosilane in the mixture and thereafter separating the complex of the amide and phenyltrichlorosilane from the phenylmethyldichlorosilane.

4. A method of separating a mixture of vinyltrichlorosilane and vinylmethyldichlorosilane which comprises contacting said mixture with an amide of the group consisting of formamide and dimethylformamide in amounts such that there is at least 2 mols of amide per mol of vinyltrichlorosilane and thereafter separating the complex of the vinyltrichlorosilane and the amide from the vinylmethyldichlorosilane.

No references cited.